United States Patent Office 3,544,278
Patented Dec. 1, 1970

3,544,278
APPARATUS FOR DETECTING GASES
George Edward Bowman, Clophill, and George Stewart Weaving, Shefford, England, assignors to National Research Development Corporation, London, England, a British corporation
Filed Mar. 26, 1968, Ser. No. 716,179
Claims priority, application Great Britain, Mar. 28, 1967, 14,109/67
Int. Cl. B01d 15/04; G01n 27/06
U.S. Cl. 23—254     2 Claims

ABSTRACT OF THE DISCLOSURE

In a gas detector, suitable for monitoring carbon dioxide concentration in glasshouses, gas is introduced into a liquid in a conductivity cell which is intermittently filled with liquid from a reservoir and is then emptied after a conductivity measurement has been made, liquid emptied from the cell passing through a deionising bed before being returned to the reservoir. The detector may be operated cyclically using an automatic control system responsive to filling and emptying of the cell.

---

This invention relates to apparatus for detecting gases, of the kind comprising a conductivity cell for measuring the conductivity of a liquid into which a gas to be detected has been introduced, and a bed of deionising material through which liquid from the cell is arranged to be passed before being reintroduced into the cell.

In a known apparatus of this kind the liquid is arranged to be circulated continuously through the cell and bed, a stream of gas to be detected being introduced into the liquid after it leaves the bed and before it enters the cell. With such an arrangement a continuous measure of gas concentration can be obtained, but the arrangement suffers from the disadvantage that for a given gas concentration the conductivity of the liquid in the cell is much lower than would be the case under equilibrium conditions, so that the apparatus is relatively insensitive and measurements are liable to be affected appreciably by variations in the rate of flow of gas.

It is therefore an object of the invention to provide an apparatus of the kind specified in which this disadvantage is alleviated.

According to the invention, an apparatus for detecting gases comprises a bed of deionising material, a conductivity cell and a reservoir for liquid respectively communicating with the bed at different points, selectively operable means for causing the cell to be filled with liquid from the reservoir via a path other than through the bed, means for introducing gas to be detected into the liquid in the cell, and selectively operable means for causing liquid to be emptied from the cell via a path such that the liquid will pass through the bed before returning to the reservoir.

It will be appreciated that with such an apparatus measurements can be made only intermittently, but this limitation is acceptable for many applications. For each measurement, it is possible for conditions in the conductivity cell to approach much nearer to equilibrium than is the case with the known apparatus referred to above.

One application for which an apparatus according to the invention is particularly suitable is its use in a system for controlling the concentration of carbon dioxide in an enclosure such as a glasshouse, the control being effected in accordance with intermittent measurements of the carbon dioxide concentration in samples of the atmosphere from the enclosure. In such an application continuous sampling of the atmosphere is not necessary, since the rate of depletion of carbon dioxide is unlikely to be very rapid.

Figure 1:
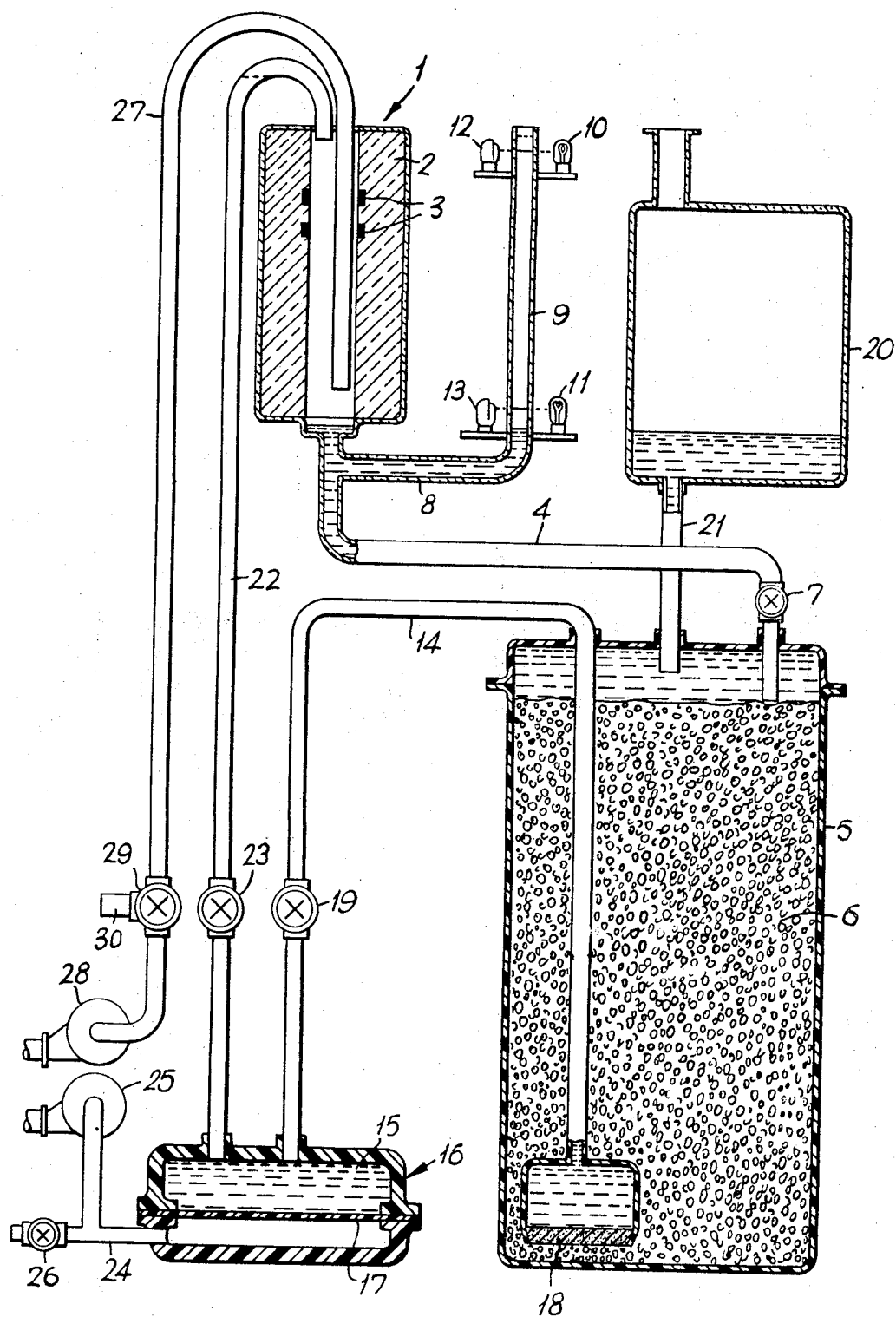
Figure 2:
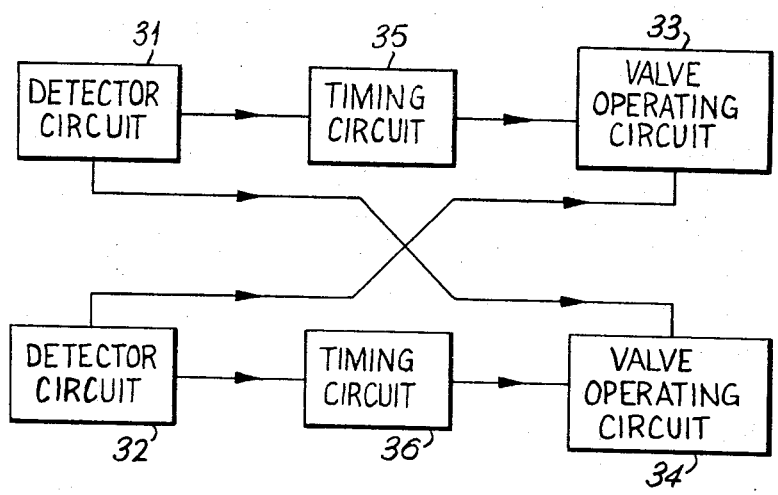

One specific form of apparatus in accordance with the invention, suitable for this application, will now be described by way of example, with reference to the accompanying drawings, in which:

FIG. 1 is a side view, partly in section and partly diagrammatic, of the apparatus; and FIG. 2 is a schematic diagram of an electrical system for automatically controlling the operation of the apparatus.

Referring to FIG. 1, the apparatus comprises a conductivity cell 1 in the form of a hollow cylinder 2 of insulating material in which are embedded a pair of annular electrodes 3 exposed to the interior of the cylinder 2. The electrodes 3 are provided with terminals (not visible in the drawing) by means of which they are connected in a conventional circuit (not shown) whereby the conductivity of a liquid filling the cell 1 may be measured. The cell 1 is disposed with its axis vertical, and is connected via a pipe 4, extending downwardly from the base of the cell 1, to the top of a container 5 within which is disposed a bed 6 deionising material, for example a mixed resin bed. The pipe 4 is provided with an electromagnetically operable valve 7, which is normally closed, and has extending from it a side tube 8 having a vertically extending transparent limb 9 disposed vertically in register with the cell 1. Associated with the limb 9 are two lamps 10 and 11 which are arranged to project horizontal beams of light through the limb 9, at levels respectively just below the top of the cell 1 and just above the base of the cell 1, the beams respectively falling on photocells 12 and 13.

A further pipe 14 extends from inside the container 5, at a point near its base, to a main reservoir 15 for liquid constituted by the upper part of a chamber 16 which is disposed below the cell 1 and which is divided in two by a flexible diaphragm 17. The pipe 14 has a filter 18 at the end inside the container 5, to prevent circulation of particles from the bed 6 through the apparatus, and is provided with a non-return valve 19 which permits flow only in a direction from the container 5 to the reservoir 15. Disposed above the container 5 is an auxiliary reservoir 20 for liquid, which is connected to the top of the container 5 by a pipe 21 and is vented to the atmosphere at its upper end.

A filler pipe 22 extends upwards from the reservoir 15, the pipe 22 having an open end disposed within the cell 1 near its top and being provided with a non-return valve 23 which permits flow only in a direction from the reservoir 15 to the cell 1. The lower part of the chamber 16 is connected via a pipe 24 to the output of a pump 25 whose input is connected to any suitable source of gas, the pump 25 being arranged to run continuously during use of the apparatus, and the pipe 24 being connectable to the atmosphere via an electromagnetically operable valve 26 which is normally open.

A pipe 27 is provided for introducing gas to be detected into the cell 1, the pipe 27 having an open end disposed within the cell 1 just above its base. When the apparatus is used as part of a system for controlling the concentration of carbon dioxide in an enclosure, the pipe 27 is connected to the output of a pump 28 arranged to draw a continuous stream of gas from the enclosure (not shown), the rate of flow of gas through the pipe 27 being settable by means of an adjustable bleed valve 29 having a connection 30 to the atmosphere. The enclosure is provided with a supply of carbon dioxide which is arranged to be turned on or off in accordance with intermittent measurements performed as described below.

In use the apparatus contains a quantity of water such that in the rest condition of the apparatus the space within the container 5, the pipe 14 and the reservoir 15 is filled with water and the water extends up through the pipe 4, side tube 8, and reservoir 20 to a level just below the base of the cell 1, and up through the filler pipe 22 to a level near the top of this pipe. The apparatus is arranged to operate cyclically under the control of the system illustrated in FIG. 2, which includes two detector circuits 31 and 32, respectively incorporating the photocells 21 and 13, and two valve operating circuits 33 and 34, respectively associated with the valves 7 and 26. The control system further includes two adjustable timing circuits 35 and 36, respectively arranged to operate in response to signals from the detector circuits 31 and 32, and respectively arranged to apply, after pre-set time delays, signals to the valve operating circuits 33 and 34 so as in the one case to open the valve 7, and in the other case to close the valve 26. The valves 7 and 26 are respectively arranged to revert to their normal states in response to signals respectively applied direct from the detector circuit 32 to the valve operating circuit 33 and direct from the detector circuit 31 to the valve operating circuit 34.

The operation of the apparatus is thus as follows for each cycle. Starting from the rest condition, in which the valve 7 is closed and the valve 26 is open, the valve 26 is firstly closed in response to a signal from the timing circuit 36. Pressure from the pump 25 is thus applied to the lower side of the diaphragm 17 causing this to be deflected upwards and thereby causing the cell 1 to be filled with water from the reservoir 15 via the pipe 22, the latter being made of relatively small bore to avoid the need for excessive deflection of the diaphragm 17. As the cell 1 fills, the water level will also rise in the side tubing 8, and when this level reaches that of the beam projected by the lamp 10 (which will typically occur about 5 seconds after the valve 26 is closed), the detector circuit 31 is actuated so as to cause the valve 26 to re-open and to initiate operation of the timing circuit 35. The opening of the valve 26 causes the flow of water to the cell 1 to cease, and permits the reservoir 15 to refill with water via the pipe 14, thus returning the diaphragm 17 positively to its original position, by virtue of the head of water in the reservoir 20.

During the sampling period determined by the setting of the timing circuit 35 (which may suitably have a value in the range of 15 to 45 seconds), the conductivity of the water in the cell 1 is continuously measured. This conductivity, which will depend on the concentration of carbon dioxide in the enclosure being controlled, will rise continuously during the sampling period as gas is bubbled into the cell 1 from the pipe 27. The supply of carbon dioxide to the enclosure is turned off or on according to whether or not the conductivity of the water in the cell 1 reaches, during the sampling period, a value in excess of a pre-set value indicative of the desired carbon dioxide concentration.

At the end of the sampling period, the valve 7 is opened in response to a signal from the timing circuit 35 thereby allowing water from the cell 1 and side tube 8 to drain into the container 5 via the pipe 4. It will be appreciated that this water must pass through the bed 6 and thereby be deionised before it can return to the reservoir 15 for reintroduction into the cell 1. As the water level passes through that of the beam of light projected by the lamp 11 (which will typically occur about 15 seconds after opening of the valve 7), the detector circuit 32 is actuated so as to cause the valve 7 to re-close and to initiate operation of the timing circuit 36. After a rest period determined by the setting of the timing circuit 36, which will normally have a length of at least 10 seconds, the cycle is re-started by closure of the valve 26 in response to a signal from the timing circuit 36.

We claim:

1. Apparatus for detecting gases, comprising a bed of deionizing material, a conductivity cell and a reservoir for liquid respectively communicating with the bed at different points, said reservoir having a wall constituted partly by a flexible diaphragm, a first selectively operable means for causing the cell to be filled with liquid from the reservoir via a path other than through the bed, said means comprising means for applying pressure to the diaphragm to deflect it inwardly with respect to the reservoir, means for introducing gas to be detected into the liquid in the cell, and a second selectively operable means for causing liquid to be emptied from the cell via a path such that the liquid will pass through the bed before returning to the reservoir.

2. Apparatus according to claim 1, in combination with a system for automatically controlling the operation of the apparatus, said system comprising means operable after a pre-determined time delay in response to filling of the cell with liquid, for bringing about operation of the means for causing the liquid to be emptied from the cell, and means, operable after a pre-determined time delay in response to empting of liquid from the cell, for bringing about operation of the means for causing the cell to be filled with liquid.

References Cited

UNITED STATES PATENTS 2,776,258   1/1957   Gilliland _____ 210—194XR
3,111,392   11/1963  Stout _____ 23—255E MORRIS O. WOLK, Primary Examiner R. M. REESE, Assistant Examiner U.S. Cl. X.R.
23—255; 324—30